United States Patent
Tett

(12) 
(10) Patent No.: US 6,633,756 B1
(45) Date of Patent: Oct. 14, 2003

(54) SYSTEM AND METHOD FOR TRACKING WIRELESS MESSAGES ORIGINATING FROM A SINGLE USER

(75) Inventor: Richard J. Tett, Plano, TX (US)

(73) Assignee: WebLink Wireless, Inc., Dallas, TX (US)

( * ) Notice: Subject to any disclaimer, the term of this patent is extended or adjusted under 35 U.S.C. 154(b) by 0 days.

(21) Appl. No.: 09/476,628

(22) Filed: Dec. 31, 1999

(51) Int. Cl.[7] .............................................. H04M 11/10
(52) U.S. Cl. ...................... 455/412; 455/415; 455/461; 379/88.21; 379/142.06
(58) Field of Search ............................... 455/31.2, 31.3, 455/411, 412, 414, 415, 461, 500, 507; 379/88.19, 88.2, 88.21, 142.06, 142.07

(56) References Cited

U.S. PATENT DOCUMENTS

| | | | |
|---|---|---|---|
| 5,740,231 A | * 4/1998 | Cohn et al. ............... | 379/88.22 |
| 5,918,158 A | * 6/1999 | LaPorta et al. ............ | 455/31.3 |
| 5,940,740 A | * 8/1999 | Aas et al. .................. | 455/31.3 |
| 6,285,745 B1 | * 9/2001 | Bartholomew et al. ..... | 370/389 |

* cited by examiner

Primary Examiner—Edward F. Urban
Assistant Examiner—Simon Nguyen

(57) ABSTRACT

There is disclosed a message tracking system for use in a wireless massaging system. The message tracking system allows a caller to verify a status of wireless messages previously sent by the caller to one or more subscribers of the wireless massaging system. The message tracking system comprises 1) an I/O interface that receives a message status request from the caller and 2) a message status controller that determines an identity of the caller from identification data received from the caller and retrieves a data record associated with the caller. The data record contains status information associated with the previously transmitted wireless messages. The message tracking system transfers to the caller selected status data associated with at least one of the previously transmitted wireless messages. The caller may check the status of multiple previously transmitted wireless messages in a single call without having to re-enter the caller's ID information.

20 Claims, 4 Drawing Sheets

SYSTEM AND METHOD FOR TRACKING WIRELESS MESSAGES ORIGINATING FROM A SINGLE USER

TECHNICAL FIELD OF THE INVENTION

The present invention is directed, in general, to wireless massaging systems and methods of operating the same, and, in particular, to a system and method for retrieving and displaying paging messages.

BACKGROUND OF THE INVENTION

The demand for better and cheaper wireless telecommunication services and equipment continues to grow at a rapid pace. Part of this demand includes wireless message paging devices, which have become ubiquitous in society. Traditional one-way wireless message receiving devices (or "pages") are giving way to newer two-way message paging devices. Additionally, the types of messages that may be sent to a page have expanded from short telephone number messages to include longer alphanumeric messages, faxes, graphics, e-mail, and even voice messages. In some systems, wireless messages may comprise an alphanumeric or voice message to which an electronic file, such as a text document, may be attached.

Despite the wider use of higher precision electronics, the implementation of time division multiple access (TDMA), frequency division multiple access (FDMA), and code division multiple access (CDMA) technologies, and the advent of narrow band PCS services, traditional problems associated with wireless massaging still persist. Message pages are frequently not delivered to a subscriber. Part of the reason for this is that the subscriber may occasionally turn off the subscriber's message paging device. But it is also true that RF signal obstructions, RF noise and multipath delay fading are significant hindrances to wireless massaging systems.

A number of technologies and/or services have attempted to overcome problems associated with the non-delivery of wireless messages. In some systems, a subscriber may call into a service by telephone and recall the last message page sent to the subscriber's paging device. In other systems, undelivered message pages may be sent to the subscriber by means of an e-mail system. This type of system requires the subscriber to maintain an e-mail account and is of limited use in listening to voice messages.

The above-described systems and services designed to overcome the non-delivery of wireless messages are intended for use by a massaging system subscriber. These services are provided as part of the service package for which the subscriber pays. But, if a subscriber does not regularly check the subscriber's messages, these services are of limited use in any event.

A caller who sends a message to a subscriber frequently has no way of knowing whether or not the message is ever received. Some wireless massaging systems allow a caller to verify the status of a previously sent message. Each message that is sent to a subscriber is given an identification (ID) number, which the caller must write down or memorize. Later, the caller may call the message paging system and request verification of the status of an earlier message. The system then prompts the caller for the ID number of the message. After the caller enters the ID number, the system gives the caller a status message, such as "Delivered," "Not Delivered," "Response Received," or the like.

These systems have numerous limitations. A caller that sends a large number of messages must memorize a large number of message ID numbers, or keep written records of all of the message ID numbers. Even, if the subscriber does record all message ID numbers, the caller still cannot rapidly retrieve the status of the messages. The caller must enter the ID number of each message in order to learn its status.

Therefore, there exists a need in the art for an improved wireless communication system that allows a caller to accurately track all of the wireless messages sent by that caller. In particular, there exists a need in the art for an improved wireless message distribution system that maintains a database containing all of the wireless messages sent by a caller and that allows the caller to rapidly access all of those messages at will. More particularly, there exists a need in the art for an improved wireless message distribution system that allows a caller to retrieve from a database and display in a convenient format on a computer screen status messages concerning all wireless messages previously sent by that caller.

SUMMARY OF THE INVENTION

The limitations inherent in the prior art described above are overcome by an improved message tracking system, for use in a wireless massaging system, capable of allowing a caller to verify a status of at least one wireless message sent to at least one subscriber of the wireless massaging system. In an advantageous embodiment of the present invention, the message tracking system comprises: 1) a first input/output (I/O) interface capable of receiving a message status request from the caller; and 2) a message status controller coupled to the first I/O interface capable of determining an identity of the caller from identification data received from the caller, retrieving a data record associated with the caller, the data record containing status information associated with the at least one wireless message, and transferring to the caller selected status data associated with a first selected one of the at least one wireless message.

In one embodiment of the present invention, the message tracking system further comprises a database coupled to the message tracking system capable of storing the at least one wireless message.

In another embodiment of the present invention, the tracking system requires the caller to enter a password prior to transferring to the caller the selected status data associated with the first selected wireless message.

In still another embodiment of the present invention, the first I/O interface is capable of receiving from the caller an incoming message directed to a selected subscriber of the wireless massaging system.

In yet another embodiment of the present invention, the message tracking system further comprises a second I/O interface capable of sending the received incoming message to an RF transceiver facility operable to wirelessly transmit the received incoming message to a paging device of the selected subscriber.

In a further embodiment of the present invention, the message tracking system further comprises an incoming wireless message controller capable of determining an identity of the caller from identification data contained in the received incoming message.

In a still further embodiment of the present invention, the message tracking system is capable of receiving from the RF transceiver facility a response message responsive to a transmission to the paging device of the received incoming message.

In one embodiment of the present invention, the message status request is received from a public telephone system.

In another embodiment of the present invention, the message status request is received from a wide area network.

The foregoing summary of the invention outlines, rather broadly, some advantageous features of various embodiments of the present invention so that those of ordinary skill in the art may better understand the detailed description that follows. Additional features of the invention will be described hereafter that form the subject matter of the claims of the invention. Those of ordinary skill in the art should appreciate that they can readily use the disclosed invention and specific embodiments as a basis for designing or modifying other structures for carrying out the same purposes of the present invention. Those of ordinary skill in the art should also realize that such equivalent constructions do not depart from the spirit and scope of the present invention in its broadest form.

Before undertaking the detailed description, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, be a property of, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, wherein like numbers designate like objects and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless massaging network.

Figure 1:
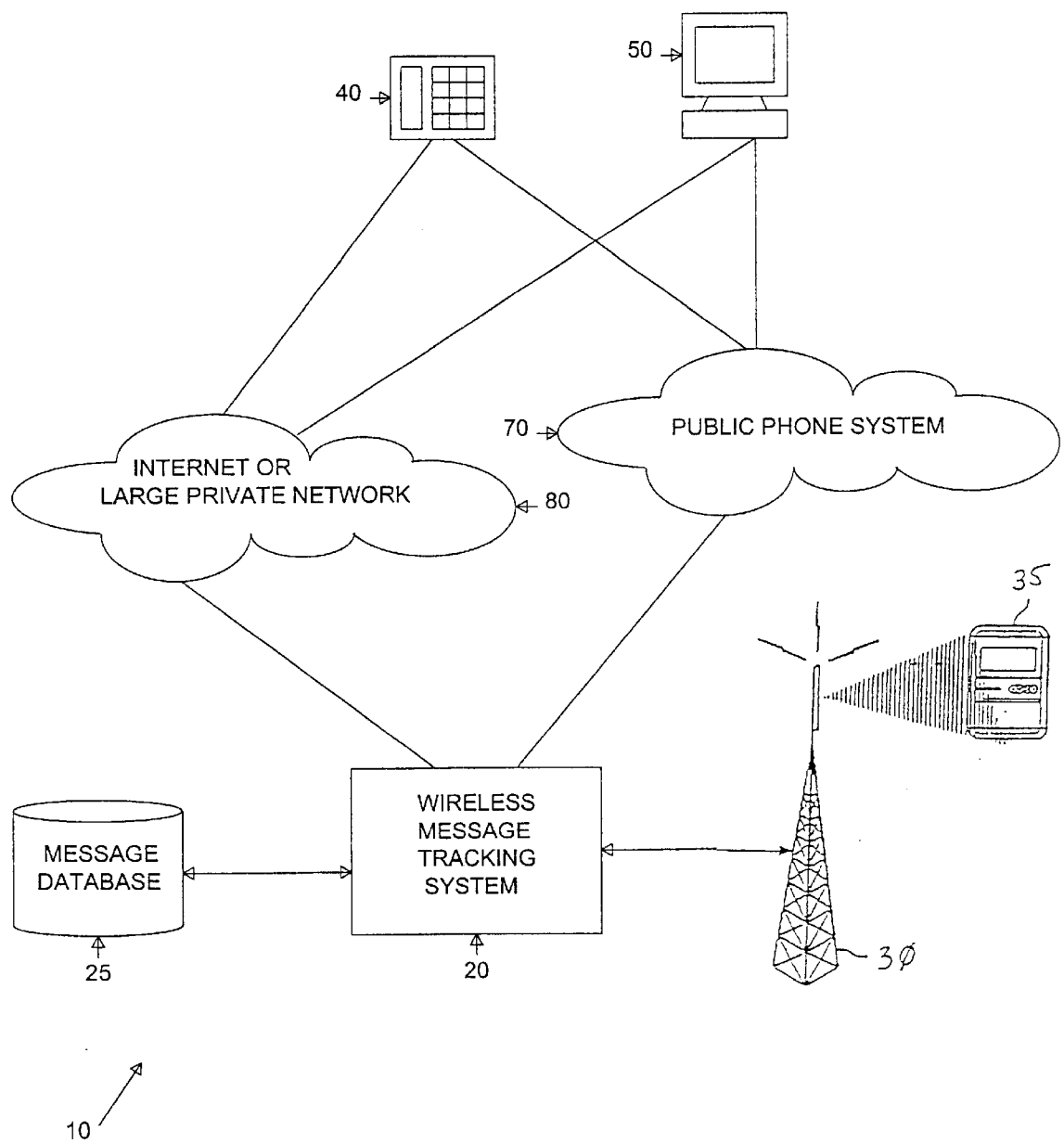
FIG. 1 illustrates a representative portion of a message paging network in accordance with one embodiment of the present invention.

FIG. 1 illustrates a representative portion of a message paging network 10 in accordance with one embodiment of the present invention. Message paging network 10 comprises a wireless message tracking system 20, a message database 25, and an RF transmitter and receiver facility 30 (hereafter referred to as "RF transceiver 30") for sending wireless messages to a subscriber's paging device 35 and, optionally, receiving wireless response messages therefrom. Depending on the level of service for which the subscriber has paid, RF transceiver 30 may send data and/or voice messages in one direction only (i.e., to the paging device 35). Alternatively, data and/or voice signals may be communicated bidirectionally between RF transceiver 30 and paging device 35. The RF transceiver 30 may comprise a single transmitter and receiver facility or may comprise an entire infrastructure of many transmitters and receivers covering a large geographical area.

Wireless message tracking system 20 receives wireless messages from a variety of input sources, including a standard telephone 40 and a end-user computer 50, and transmits the wireless messages to paging device 35 via RF transceiver 30. In the descriptions that follow, the person accessing wireless message tracking system 20 in order to verify the status of previously transmitted messages is, from time-to-time, referred to as "caller" and/or "end-user" instead of "subscriber." The message tracking or message status verification services provided by the present invention may be provided to outside callers without charge as an enhancement to the services normally provided to subscribers. Information related to each wireless message sent to a subscriber is stored in message database 25 for later retrieval and viewing by the caller/end user.

Wireless messages may be entered by a caller (or end user) on telephone 40 by pressing the telephone keypad buttons to thereby generate DTMF tones that are interpreted by wireless message tracking system 20 as, for example, a telephone number that the subscriber should call in order to respond. In more advanced systems, combinations of DTMF tones may be interpreted as letters and numbers (i.e., alphanumeric characters) to thereby enable the caller to send alphanumeric text messages to the subscriber. In still more advanced wireless massaging systems, the caller may enter voice messages that are sent to paging device 35.

End-user computer 50 is representative of any one of a large number of processing devices that may be used to create alphanumeric text and/or voice messages that are sent to paging device 35 and to receive response messages from paging device 35. End-user computer 50 also may be used to retrieve and to display information stored in message database 25 relating to alphanumeric text and/or voice messages that were sent to paging device 35 and to retrieve and to display information relating to response messages that were sent by paging device 35. For example, end-user computer 50 may be a standard desktop personal computer (PC), a laptop PC, a hand held processing device, such as a PalmPilot®, a two-way paging device, or the like. End-user computer 50 may also include a dedicated paging controller embedded in a larger piece of equipment, such as an oil rig, a vending machine, or a vehicle, that generates paging messages, particularly alarms and notifications, in order to alert a supervisor or maintenance person of a condition in the equipment. In one embodiment of the present invention, end-user computer 50 comprises a desktop PC capable of operating a browser application, such as Netscape Navigator® or MicroSoft Internet Explorer®.

Wireless message tracking system 20 may communicate with telephone 40 and end-user computer 50 via the public phone system 70 or by the Internet (or a large private network) 80. At least portions of the phone system 70 or Internet (large private network) 80 may include a wireless network. Although wireless messages may be transferred to the wireless message tracking system 20 by telephone 40 and end-user computer 50 through either the public phone system 70 or the Internet 80, as a practical matter, most "conventional" numeric paging messages are received via the public phone system 70. The means by which a caller/end user operating end-user computer 50 accesses wireless message tracking system 20 may be selected at the caller's option. The caller/end user may use a direct dial-in connection to wireless message tracking system 20. (i.e., via the public phone system 70) or may use a browser application on end-user computer 50 to access wireless message tracking system 20 via the Internet 80, or both.

In a preferred embodiment of the present invention, wireless message tracking system 20 is essentially a server that receives wireless messages from different clients via the public telephone system 70 and the Internet 80, forwards the messages to RF transceiver 30, and stores wireless response messages sent by the subscriber in database 25. Wireless message tracking system 20 then allows client devices to use graphical user interfaces to selectively view status information regarding previously sent wireless messages and the wireless message responses received from the subscriber, if any. After the status of a wireless message has been retrieved, the end user may issue another response message or generate a new wireless message.

Once a caller/end user has entered into a session with the server in wireless message tracking system 20 by entering a caller ID and a caller password, the caller can issue response messages and/or generate new follow-up messages without re-entering the caller ID or re-entering the number of the subscriber to whom the end user wishes to send a response message.

Figure 2:
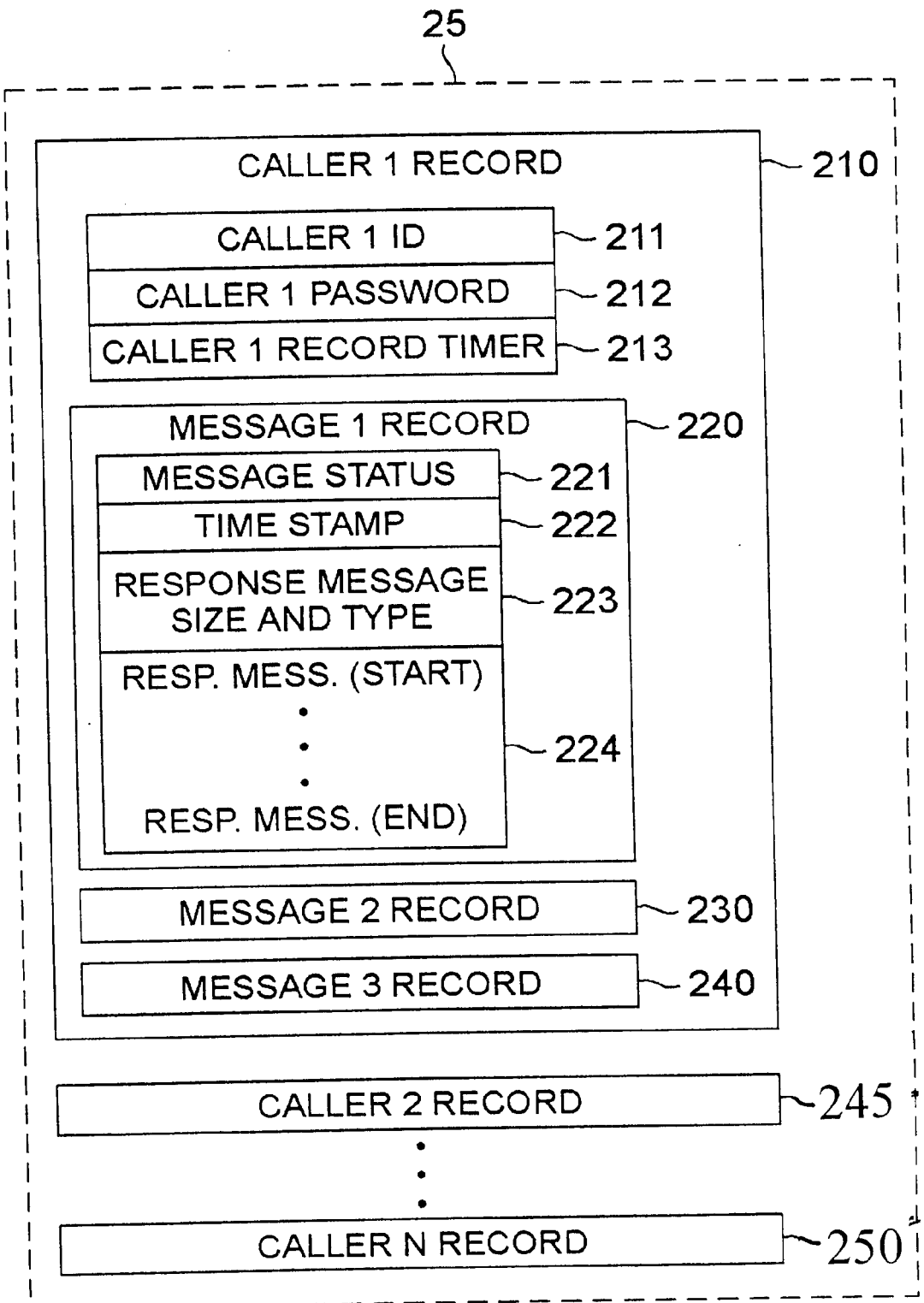
FIG. 2 illustrates representative caller data records in a message database in the message paging network in accordance with one embodiment of the present invention.

FIG. 2 illustrates representative caller records 210, [240] 245 and 250 in message database 25 in message paging network 10 in accordance with one embodiment of the present invention. The contents of caller records 210, [240] 245 and 250 vary according to the type of massaging service used by the caller and/or the called subscriber. Nonetheless, caller record 210 (hereafter "Caller 1 Record") is representative of any one of the records for Caller 1 through Caller N. In Caller 1 Record, message records 220,230, and 240, referred to hereafter as Message 1 Record, Message 2 Record, and Message 3 Record, respectively, have been stored in message database 25 by wireless message tracking system 20.

Caller 1 Record contains Caller 1 ID field 211 and Caller 1 Password field 212, which are used to access Caller 1 Record and confirm the identity of Caller 1. In an exemplary embodiment, Caller 1 ID may simply be the telephone number of Caller 1, or the telephone number of paging device 35 used by the called subscriber, or any other identification that Caller 1 may choose. When a wireless message is sent from telephone 40 or from end-user computer 50 to paging device 35, a copy of the message is stored in message database 25 in a caller data record identified by the Caller ID entered by the caller/end-user at the start of the call (or session).

During message retrieval, a caller is prompted to enter the Caller ID to initiate access to a caller record. Wireless message tracking system 20 then requests a password from the caller before granting actual access. If Caller 1 enters Caller 1 ID and the proper Caller 1 Password, Caller 1 can retrieve and view Message 1 Record, Message 2 Record, and Message 3 Record.

Caller 1 Record also comprises caller record timer 213, hereafter referred to as Caller 1 Record Timer, which stores a time indicia that is used to track how long Caller 1 Record has been alive in the system. In order to limit the amount of memory and processing resources consumed by wireless message tracking system 20, old or stale caller records may be periodically purged according to pre-defined system parameters. For example, Caller 1 Record may be purged after a given amount of time has passed since the establishment of Caller 1 Record. Alternatively, Caller 1 Record Timer may be reset each time Caller 1 accesses wireless message tracking system 20, thereby keeping Caller 1 Record alive as long as each new access by Caller 1 follows the previous access within the time limit specified in Caller 1 Record Timer.

Message record 210 (Message 1 Record) comprises Message Status field 221, time stamp 222, response message size and type field 223, and response message field 224. Message Status field 221 comprises a status word used to indicate the status of Message 1 previously sent by Caller 1, such as "delivered," "undelivered," "read," "unread," "response received," "no response," and the like. Time stamp 222 comprises one or more time values identifying the time at which certain events related to Message 1 occurred. The time values may include: Time of Receipt of Message 1, Time of Receipt of Message 1 response, and the like. Response Message Size and Type field 223 contains a first sub-field that stores parameter values indicating the number of bytes in the response message and a second sub-field that stores the message type (e.g., numeric, alphanumeric, voice, graphic file, document file, of the like). Finally, Response Message field 224 contains the actual data that comprises the subscriber's wireless message response to Message 1 sent by Caller 1.

Figure 3:
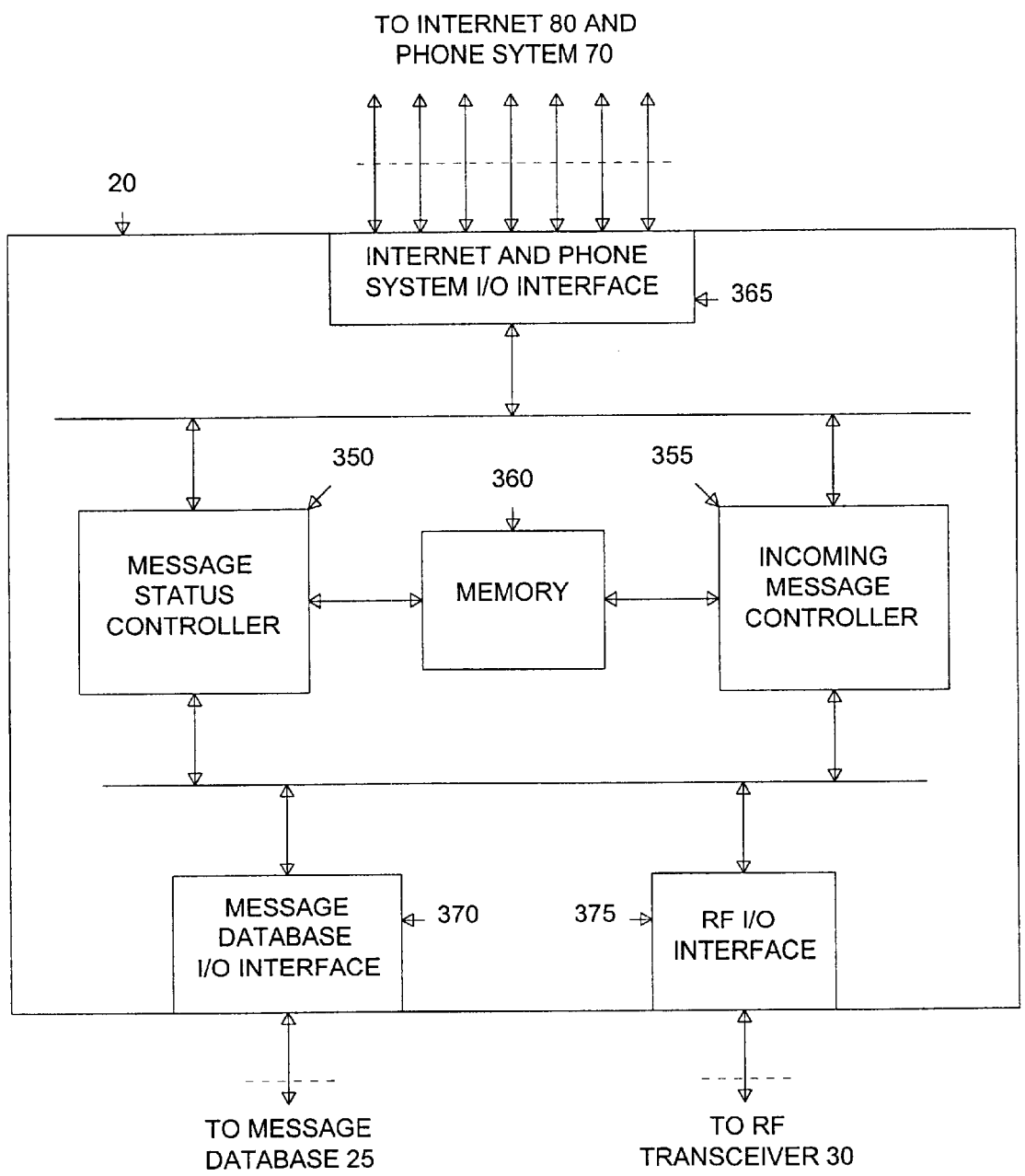
FIG. 3 illustrates an exemplary wireless massaging distribution system according to one embodiment of the present invention.

FIG. 3 illustrates exemplary wireless message tracking system 20 according to one embodiment of the present invention. Wireless message tracking system 20 in the exemplary embodiment is a server that handles incoming wireless messages intended for paging device 35, and also handles message status requests received from callers/end users attempting to review the status of previously transmitted wireless messages. Wireless message tracking system 20 comprises message status controller 350, incoming message controller 355, and associated memory 360 shared by both controllers.

Message status controller 350 and incoming message controller 355 are coupled by a common bus to Internet and phone system I/O interface 365, which transfers data to and from public phone system 70 and Internet 80. Incoming wireless messages are directed by Internet and phone system I/O interface 365 to incoming message controller 355. Message status requests are similarly directed to message status controller 350 by Internet and phone system I/O interface 365. Internet and phone system I/O interface 365 may distinguish between incoming wireless messages and incoming message status requests according to the received Internet address or the telephone number to which the incoming call is directed.

Message status controller 350 and incoming message controller 355 are also connected by means of a common bus to message database I/O interface 370 and RF I/O interface 375. Message database I/O interface 370 stores and retrieves caller records to and from message database 25. RF I/O interface 375 transfers incoming wireless messages to RF transceiver 30 and, in the case of two-way massaging systems, receives wireless messages from RF transceiver 30. The methods by which incoming message controller 355 handles incoming wireless messages and message status controller 350 handles incoming message status requests are described below in greater detail in connection with FIG. 4.

Figure 4:
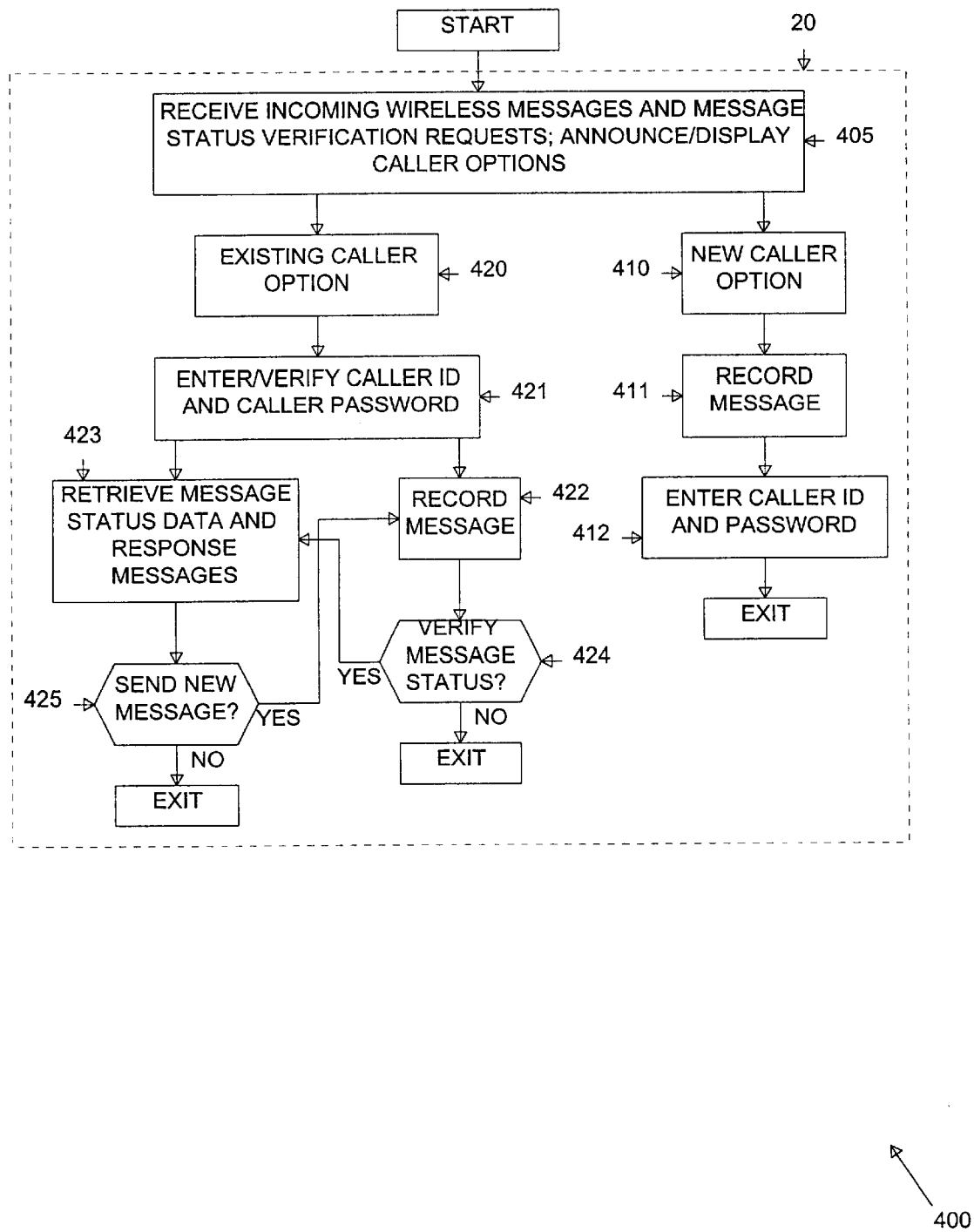
FIG. 4 depicts a flow diagram illustrating the operation of the wireless massaging distribution system shown in FIG. 3.

FIG. 4 depicts flow diagram 400 illustrating the operation of wireless message tracking system 20. Initially, wireless message tracking system 20 is accessed by a caller from telephone 40 or by an end user operating end-user computer 50. During the call or session, wireless message tracking system 20 receives an incoming wireless message directed to a selected subscriber and/or a message status request from a caller/end-user who previously sent a wireless message to a subscriber. Depending on the device used to access wireless message tracking system 20, caller options may be announced to telephone 40 using "canned" voice scripts or displayed on the monitor of end-user computer 50 (process step 405). In an advantageous embodiment of the present invention, wireless message tracking system 20 initially asks (or visually prompts) a caller (or end-user) to select an "Existing Caller Option" if the caller has previously sent messages to subscribers or to select a "New Caller Option" if the caller has not previously sent messages to subscribers.

If the caller/end user selects "New Caller Option," control of the call/session is transferred to new caller option routine 410. Wireless message tracking system 20 uses additional voice prompt messages and/or screen display messages to ask the caller to enter a voice message or text message. Wireless message tracking system 20 then records and stores the callers's message (process step 411). Next, wireless message tracking system 20 may use standard voice/screen display prompts to ask the caller to enter a Caller ID and/or a Caller Password by means of the telephone keypad or computer keyboard. If the caller/end user enters a Caller ID and/or Caller Password, wireless message tracking system 20 creates a new caller record in message database 25 (process step 412). Alternatively, the caller/end user may simply hang up or disconnect, in which case wireless message tracking system 20 simply forwards the caller's message to the intended subscriber.

If the caller/end user selects "Existing Caller Option," control of the call/session is transferred to existing caller option routine 420. Wireless message tracking system 20 uses additional voice prompt messages and/or screen display messages to ask the caller to enter the caller's existing Caller ID and Caller Password. Wireless message tracking system 20 then verifies the Caller ID and Caller Password that are entered (process step 421).

Next, wireless message tracking system 20 may use voice/screen display prompts to ask the caller/end user to select one of two options: 1) to send a new voice or alphanumeric message to a subscriber; or 2) to retrieve status information related to previously sent voice and/or alphanumeric messages. If the caller/end-user selects option 1, wireless message tracking system 20 records and stores the caller's wireless message (process step 422). Alternatively, if the caller/end-user selects option 2, wireless message tracking system 20 retrieves from message database 25 any message status data and/or response messages stored in the caller record corresponding to the previously entered Caller ID and displays/plays the retrieved information to the caller (process step 423). In an advantageous embodiment of the present invention, wireless message tracking system 20 may use additional voice scripts/display prompts to enable the caller to select only the status information of specified wireless messages, rather than receiving the status information of all previously transmitted wireless messages associated with that caller.

After recording and storing the wireless message for a caller that selected option 1 above, wireless message tracking system 20 may use voice/screen display prompts to ask if the caller would also like to verify the status of a previously transmitted wireless message (process step 424). If so, the caller is transferred to process step 423, as described above.

After retrieving and displaying any message status data and/or response messages stored in the caller record of a caller that selected option 2 above, wireless message tracking system 20 may use voice/screen display prompts to ask if the caller would also like to send a new wireless message to a subscriber (process step 425). If so, the caller is transferred to process step 422 as described above.

Although the principles of the present invention have been described in detail with reference to message paging system and infrastructure embodiments, those of ordinary skill in the art should understand that they can make various changes, substitutions and alterations herein without departing from the spirit and scope of the invention in its broadest form.

What is claimed is:

1. For use in a wireless massaging system, a message tracking system capable of allowing a caller to verify a status of at least one wireless message sent to at least one subscriber of said wireless massaging system said wireless message tracking system comprising:

a first input/output (IO) interface capable of (i) receiving from said caller an incoming message directed to a selected subscriber of said wireless massaging system, and (ii) receiving a message status request from said caller;

an incoming wireless message controller coupled to said first I/O interface capable of determining an identity of said caller from caller identification data contained in said received incoming message and associating said identity of said caller with a data record; and a message status controller coupled to said first I/O interface capable of determining an identity of said caller from caller identification data received from said caller, said caller identification data excluding message identification data, selectively retrieving said data record associated with said caller utilizing said caller identification data, said data record containing status information associated with said at least one wireless message, and transferring to said caller selected status data associated with a first selected one of said at least one wireless message.

2. The message tracking system set forth in claim 1, further comprising a database coupled to said message tracking system capable of storing said at least one wireless message.

3. The message tracking system set forth in claim 1 wherein said tracking system requires said caller to enter a password prior to transferring to said caller said selected status data associated with said first selected wireless message.

4. The message tracking system set forth in claim 1 further comprising a second I/O interface capable of sending said received incoming message to an RF transceiver facility operable to wirelessly transmit said received incoming message to a paging device of said selected subscriber.

5. The message tracking system set forth in claim 4 wherein said message tracking system is capable of receiving from said RF transceiver facility a response message responsive to a transmission to said paging device of said received incoming message.

6. The message tracking system set forth in claim 1 wherein said message status request is received from a public telephone system.

7. The message tracking system set forth in claim 1 wherein said message status request is received from a data processing system coupled to a wide area data network.

8. The message tracking system set forth in claim 1 wherein said message status controller, in transferring to said caller selected status data associated with a first selected one of said at least one wireless message, transfers to said caller selected status data associated with all wireless messages within said data record associated with identity of said caller.

9. The message tracking system set forth in claim 1 wherein said message status controller, in transferring to said caller selected status data associated with a first selected one of said at least one wireless message, identifies each wireless message within said data record to said caller for selection of messages for which status information is desired and transfers to said caller selected status data associated with all selected wireless messages within said data record.

10. A wireless massaging system comprising:
    a plurality of RF transceiver facilities capable of transmitting and receiving wireless messages to and from paging devices used by subscribers of said wireless massaging system; and
    a message tracking system capable of allowing a caller to verify a status of at least one wireless message sent to at least one subscriber of said wireless messaging system, said message tracking system comprising:
        a first input/output (I/O) interface capable of (i) receiving from said caller an incoming message directed to a selected subscriber of said wireless messaging system, and (ii) receiving a message status request from said caller;
        an incoming wireless message controller coupled to said first I/O interface capable of determining an identity of said caller from caller identification data contained in said received incoming message and associating said identity of said caller with a data-record; and
        a message status controller coupled to said first I/O interface capable of determining an identity of said caller from caller identification data received from said caller, said caller identification data excluding message identification data, selectively retrieving said data record associated with said caller utilizing said caller identification data, said data record containing status information associated with said at least one wireless message, and transferring to said caller selected status data associated with a first selected one of said at least one wireless message.

11. The wireless messaging system set forth in claim 10, further comprising a database coupled to said message tracking system capable of storing said at least one wireless message.

12. The wireless messaging system set forth in claim 10 wherein said first I/O interface is capable of receiving from said caller an incoming message directed to a selected subscriber of said wireless messaging system.

13. The wireless messaging system set forth in claim 10 further comprising a second I/O interface capable of sending said received incoming message to a selected one of said plurality of RF transceiver facilities, wherein said selected RF transceiver facility is operable to wirelessly transmit said received incoming message to a paging device of said selected subscriber.

14. The wireless messaging system set forth in claim 13 wherein said message tracking system is capable of receiving from said selected RF transceiver facility a response message responsive to a transmission to said paging device of said received incoming message.

15. The message distribution system set forth in claim 10, wherein said message status request is received from a public telephone system.

16. The message distribution system set forth in claim 10 wherein said message status request is received from a data processing system coupled to a wide area data network.

17. For use in a wireless messaging system, a method for allowing a caller to verify a status of at least one wireless message sent to at least one subscriber of the wireless messaging system, the method comprising the steps of:
    through a first input/output (I/O) interface, one of (i) receiving from said caller an incoming message directed to a selected subscriber of said wireless messaging system, and (ii) receiving a message status request from the caller;
    in response to said received incoming message, determining an identity of said caller from caller identification data contained in said received incoming message and associating said identity of said caller with a data record;
    in response to said received message status request, determining an identity of the caller from caller identification data received from the caller, said caller identification data excluding message identification data;
    retrieving a data record associated with the caller utilizing said caller identification data, the data record containing status information associated with the at least one wireless message; and
    transferring to the caller selected status data associated with a first selected one of the at least one wireless message.

18. The method set forth in claim 17 including the further step of requiring the caller to enter a password prior to transferring to the caller the selected status data associated with the first selected wireless message.

19. The method set forth in claim 17 wherein said step of transferring to the caller selected status data associated with a first selected one of the at least one wireless message further comprises:
    transferring to said caller selected status data associated with all wireless messages within said data record associated with identity of said caller.

20. The method set forth in claim 17 wherein said step of transferring to the caller selected status data associated with a first selected one of the at least one wireless message further comprises:
    identifying each wireless message within said data record to said caller for selection of messages for which status information is desired; and
    transferring to said caller selected status data associated with all selected wireless messages within said data record.

* * * * *